(12) United States Patent
Phung et al.

(10) Patent No.: US 10,766,983 B2
(45) Date of Patent: Sep. 8, 2020

(54) PVOH DISPERSANT FOR VCM POLYMERIZATION

(71) Applicant: Sekisui Specialty Chemicals America, LLC, Dallas, TX (US)

(72) Inventors: K. Van Phung, Houston, TX (US); Yohei Nishimura, Houston, TX (US); Tsutomu Ando, Houston, TX (US); Hidehiro Yamaguchi, Houston, TX (US); Joseba Inaki Iragorri, Houston, TX (US); Kaustubh Ghorpade, Houston, TX (US)

(73) Assignee: Sekisui Specialty Chemicals America, LLC, Dallas, TX (US)

( * ) Notice: Subject to any disclaimer, the term of this patent is extended or adjusted under 35 U.S.C. 154(b) by 20 days.

(21) Appl. No.: 15/555,856

(22) PCT Filed: Mar. 4, 2016

(86) PCT No.: PCT/US2016/020799
§ 371 (c)(1),
(2) Date: Sep. 5, 2017

(87) PCT Pub. No.: WO2016/141256
PCT Pub. Date: Sep. 9, 2016

(65) Prior Publication Data
US 2018/0044451 A1    Feb. 15, 2018

Related U.S. Application Data

(60) Provisional application No. 62/128,694, filed on Mar. 5, 2015.

(51) Int. Cl.
| | |
|---|---|
| *C08F 116/06* | (2006.01) |
| *C08F 114/06* | (2006.01) |
| *C08F 14/06* | (2006.01) |
| *C08F 2/20* | (2006.01) |
| *C08F 216/06* | (2006.01) |

(52) U.S. Cl.
CPC .............. *C08F 116/06* (2013.01); *C08F 2/20* (2013.01); *C08F 14/06* (2013.01); *C08F 114/06* (2013.01); *C08F 216/06* (2013.01)

(58) Field of Classification Search
CPC ................................................... C08F 116/06
See application file for complete search history.

(56) References Cited

U.S. PATENT DOCUMENTS

| | | | |
|---|---|---|---|
| 4,208,499 A | 6/1980 | Maruhashi et al. | |
| 5,780,547 A | 7/1998 | Saeki et al. | |
| 5,849,840 A | 12/1998 | Maruhashi et al. | |
| 5,977,273 A | 11/1999 | Saeki et al. | |
| 7,070,731 B2 | 7/2006 | Kato et al. | |
| 7,193,012 B2 | 3/2007 | Shibutani | |
| 8,222,325 B2 | 7/2012 | Michel et al. | |
| 8,389,633 B2 | 3/2013 | Park | |
| 2004/0186232 A1 | 9/2004 | Shibutani | |
| 2006/0122322 A1 | 6/2006 | Chrisstoffels et al. | |
| 2006/0180956 A1 | 8/2006 | Kato et al. | |
| 2007/0225421 A1 | 9/2007 | Origuchi et al. | |
| 2009/0253880 A1 | 10/2009 | Shibutani et al. | |
| 2013/0324655 A1 | 12/2013 | Yoshii | |
| 2016/0121602 A1 | 5/2016 | Nagasu et al. | |
| 2017/0129979 A1 | 5/2017 | Chabrol et al. | |
| 2017/0137542 A1 | 5/2017 | Shaw et al. | |

FOREIGN PATENT DOCUMENTS

| | | |
|---|---|---|
| CA | 2827835 A1 | 8/2012 |
| CN | 101506255 A | 8/2009 |
| CN | 101928357 A | 12/2010 |
| CN | 102229685 A | 11/2011 |
| CN | 103214604 A | 7/2013 |
| CN | 103370341 A | 10/2013 |
| CN | 101506255 B | 2/2014 |
| CN | 103788305 A | 5/2014 |
| CN | 101928357 B | 2/2015 |
| CN | 103214604 B | 3/2015 |
| CN | 105153335 A | 12/2015 |
| CN | 103788234 B | 9/2016 |
| CN | 104877056 B | 5/2017 |
| DE | 3590744 C2 | 1/1992 |
| EP | 1433794 A1 | 6/2004 |
| EP | 1443060 A1 | 8/2004 |
| EP | 1433794 B1 | 2/2008 |
| EP | 2058342 A1 | 5/2009 |
| EP | 2058342 B1 | 5/2011 |
| EP | 2679606 A1 | 1/2014 |
| EP | 3119815 A1 | 1/2017 |
| GB | 2181143 B | 7/1988 |
| JP | 2004-189889 A | 7/2004 |
| JP | 2013500739 A | 1/2013 |
| KR | 20090033468 A | 4/2009 |

(Continued)

OTHER PUBLICATIONS

Machine translation of JP 2004/189889. (Year: 2004).*
Office Action issued in corresponding Japanese Application No. 2017-546666 dated Jul. 31, 2018, and English translation thereof (7 pages).
International Search Report issued in PCT/US2016/020799 dated Jul. 25, 2016 (3 pages).
Written Opinion of the International Searching Authority issued in PCT/US2016/020799 dated Jul. 25, 2016 (9 pages).
Extended European Search Report issued in corresponding European Application No. 16759546.1 dated Jun. 25, 2018 (8 pages).

*Primary Examiner* — Wenwen Cai
(74) *Attorney, Agent, or Firm* — Osha Liang LLP (57) ABSTRACT

Dispersing agents useful in a suspension polymerization process may be formed based on polyvinyl alcohols and processes discloses herein. The dispersing agent may include, for example: a polyvinyl alcohol having a degree of hydrolysis in the range from 60 to 80 mol %; an absorbance of not less than 0.3 measured at a wavelength of 320 nm with respect to a 0.1 wt % aqueous solution of the polyvinyl alcohol; a block character of remaining ester groups in the range from 0.4 to 0.5; and a cloud point in the range from 35° C. to 50° C. measured with respect to a 1 wt % aqueous solution of the polyvinyl alcohol. Carbonyl groups are theorized to be present along the polymer chain, which may be quantified by 1-H NMR spectra peaks.

14 Claims, 3 Drawing Sheets

(56) References Cited

FOREIGN PATENT DOCUMENTS

| KR | 20140012068 A | 1/2014 |
|---|---|---|
| KR | 20160140757 A | 12/2016 |
| RU | 2013142964 A | 3/2015 |
| RU | 2583156 C2 | 5/2016 |
| SG | 192871 A1 | 9/2013 |
| TW | 201235092 A | 9/2012 |
| TW | I513503 B | 12/2015 |
| TW | 201700157 A | 1/2017 |
| WO | 1986/005191 A1 | 9/1986 |
| WO | 2008015739 A1 | 2/2008 |
| WO | 2012114441 A1 | 8/2012 |
| WO | 2016141256 A1 | 9/2016 |

\* cited by examiner

PVOH DISPERSANT FOR VCM POLYMERIZATION

FIELD OF THE DISCLOSURE

Embodiments disclosed herein relate generally to a dispersing agent. More particularly, embodiments disclosed herein relate to a dispersing agent useful during the suspension polymerization of vinyl compounds. Even more particularly, embodiments disclosed herein relate to a polyvinyl alcohol based dispersing agent that may be used to more efficiently polymerize vinyl chloride monomers.

BACKGROUND

Polyvinyl chlorides are generally produced via the suspension polymerization process. The suspension polymerization process generally includes dispersing the vinyl chloride monomer in an aqueous medium in the presence of a dispersing agent, such as a polyvinyl alcohol.

Various polyvinyl alcohol dispersants have been proposed to limit foaming during polymerization of a vinyl chloride monomer, produce a polyvinyl chloride of a desired particle size and/or particle size distribution, and form a relatively stable solution under reactor charging and/or polymerization conditions, among other factors. For example, various polyvinyl alcohol dispersants are described in U.S. Pat. Nos. 7,070,731, 8,389,633, 5,977,273, 5,780,547, and 7,193,012, among others.

Numerous factors may impact the quality of the resulting polyvinyl chloride. As noted in the U.S. Pat. No. 7,070,731 patent, the dispersion stabilizer may have a considerable effect.

SUMMARY OF THE DISCLOSURE

In one aspect, embodiments disclosed herein relate to a dispersing agent useful in a suspension polymerization process. The dispersing agent may include: a polyvinyl alcohol having a degree of hydrolysis in the range from 60 to 80 mol %; an absorbance of not less than 0.3 measured at a wavelength of 320 nm with respect to a 0.1 wt % aqueous solution of the polyvinyl alcohol; a block character of remaining ester groups in the range from 0.4 to 0.5; and a cloud point in the range from 35° C. to 50° C. measured with respect to a 1 wt % aqueous solution of the polyvinyl alcohol.

In another aspect, embodiments disclosed herein relate to a dispersing agent useful in a suspension polymerization process. The dispersing agent may include: a polyvinyl alcohol having: a degree of hydrolysis in the range from 60 to 80 mol %; an absorbance of not less than 0.3 measured at a wavelength of 320 nm with respect to a 0.1 wt % aqueous solution of the polyvinyl alcohol; a block character of remaining acethyl groups of from 0.4 to 0.5; an integral value (a), defined as the area of a peak proximate 5.52+/−0.02 ppm, in the range from about 0.05 to about 0.15 pph CH, CH being defined as the area of a peak proximate 3.85+/−0.02 ppm; and an integral value (b), defined as the area of a peak proximate 5.88+/−0.02 ppm, in the range from about 0.1 to about 0.4 pph CH.

A dispersion or suspension may be used forming the above described dispersing agents, such as by mixing the dispersing agent with an aqueous medium, such as water. The dispersing agents or dispersions may be useful in solution polymerization processes, such as for the solution polymerization of vinyl monomers, such as vinyl chloride.

Other aspects and advantages will be apparent from the following description and the appended claims.

DETAILED DESCRIPTION

Embodiments disclosed herein relate generally to a dispersing agent. More particularly, embodiments disclosed herein relate to a dispersing agent useful during the suspension polymerization of vinyl compounds. Even more particularly, embodiments disclosed herein relate to a polyvinyl alcohol based dispersing agent that may be used to more efficiently polymerize vinyl chloride monomers.

Polyvinyl alcohol dispersing agents according to embodiments herein may be based on various vinyl ester compounds, such as vinyl formate, vinyl acetate, vinyl propionate, vinyl butyrate, vinyl pivalate, and vinyl versatate, among other saturated linear or branched vinyl esters known in the art. Mixtures of two or more of the vinyl ester compounds, or mixtures of the vinyl ester with other comonomers may also be used. In some embodiments, polyvinyl alcohol dispersing agents according to embodiments herein may be based on vinyl acetate monomer (VAM) or a mixture including VAM. In yet other embodiments, polyvinyl alcohol dispersing agents according to embodiments herein may be produced from a monomer consisting of or consisting essentially of vinyl acetate monomer.

Polyvinyl alcohol dispersing agents may be formed via the polymerization or copolymerization of a vinyl ester compound. The vinyl ester polymer thus obtained may be partially saponified (partially hydrolyzed) to form a vinyl alcohol polymer. The resulting vinyl alcohol polymer may then be further treated to introduce polyene groups (conjugated double bonds) into the backbone of the polymer and to result in a polyvinyl alcohol having a degree of hydrolysis in the range from about 60 to about 80%, as measured by titration.

For example, the polyvinyl alcohol may be produced via a process including the following simplified reaction sequence:

where Ac represents an acethyl group, OH is a hydroxide group, and x, y, and z represent the relative mole fraction of the respective components parts of the polymer, where x+y+z=1, and are each between 0 and 1. In other words, x+y+z=1, and each are non-zero. The ratio of y and z is similar to the degree of hydrolysis, and x is typically in the range from about 0.001 to about 0.2, such as from about 0.001 to about 0.05. The position and number of groups is important with respect to the ability of the resulting polyvinyl alcohol to act as a surfactant or a dispersing agent. It is desirable to have multiple conjugated double bond segments (segment x) next to each other within the polymer chain. It is also desirable to have a relatively block character to the acethyl and hydroxide containing groups (segments y and z). In this manner, the hydrocarbon-like portions of the chain and the hydroxide-containing portions may orient themselves in an aqueous medium so as to provide a stable emulsion or suspension. While illustrated with respect to vinyl acetate monomer, the reaction scheme can be used to produce polyvinyl alcohol dispersing agents according to embodiments herein from other ester monomers (i.e., Ac in the above formulae would be replaced by another ester group).

In the reaction step (1), for example, a vinyl ester compound, such as vinyl acetate monomer (VAM) as illustrated, may be polymerized to form a polyvinyl ester, such as polyvinyl acetate. In some embodiments, reaction step (1) may be performed in the absence of or essentially free of a chain transfer agent, such as an aldehyde or a ketone. Additionally, in some embodiments, reaction step (1) may be performed in the absence of or essentially free of a comonomer, for example an olefinic comonomer such as ethylene, propylene or styrene, among others. As defined herein, "in the absence of" or "essentially free of" refer to the lack of purposeful addition of the comonomer or chain transfer agent, and does not exclude the impurity levels of various compounds that may be classified as a chain transfer agent or comomoner that are commonly present in a VAM feedstock. The polymerization may be performed, for example, via bulk polymerization, solution polymerization, emulsion polymerization, suspension polymerization, and the like. Polymerization conditions may include any temperature appropriate for the polymerization of the vinyl esters, such as in the range from about −80° C. to about 300° C., and may be performed using a free radical initiator, such as a peroxide or azobisisobutyronitrile (AIBN) initiator, among others.

Saponification, reaction step (2), may be performed, for example, by contacting the vinyl ester polymer with an alkali to result in ester exchange or direct hydrolysis. Saponification temperatures may be, for example, in the range from about 10° C. to about 70° C., such as in the range from about 20° C. to about 50° C. Examples of alkali compositions useful in embodiments herein include alkali metal hydroxides such as potassium hydroxide, sodium hydroxide and lithium hydroxide, and alkali metal alcoholates such as sodium methoxide, sodium ethoxide, potassium methoxide, potassium ethoxide and potassium t-butoxide, among others. In some embodiments, saponification may be performed by contacting the vinyl ester polymer with a mixture of an alkali and an oxidizing agent. Oxidizing agents may include any oxygen-containing compound that may be useful to introduce carbonyl groups along the polymer chain, and may include, for example, various acids, peroxides, perchlorates, and chlorinated isocyanurates, among others. In some embodiments, the oxidizing agent is a peroxide, such as hydrogen peroxide, or peracetic acid, among others. In some embodiments, the partial saponification is performed in the presence of a mixture of sodium hydroxide and hydrogen peroxide. The oxidizing agent may be used, for example, in amounts up to about 5 wt % of the polyvinyl ester, such as from about 1 wt % to about 4 wt %. The alkali, such as an alkali hydroxide, may be used, for example, in amounts ranging from about 0.0005 mol/mol polyvinyl ester to about 0.01 mol/mol polyvinyl ester, such as from about 0.001 mol/mol to about 0.003 mol/mol in other embodiments, for example 0.002 mol/mol.

Solvents useful for performing the saponification may include alcohols such as methanol, ethanol, isopropyl alcohol, n-propyl alcohol, n-butanol, isobutanol, sec-butanol, t-butanol, amyl alcohol and cyclohexanol; cyclic ethers such as tetrahydrofuran and dioxane; ketones such as acetone, methyl ethyl ketone, methyl isobutyl ketone and pinacolin; sulfoxides such as dimethyl sulfoxide; hydrocarbons such as toluene, benzene, n-hexane and cyclohexane; and mixture of these, among other compounds capable of swelling or dissolving the vinyl ester polymer and/or the resulting vinyl alcohol polymer.

The saponified vinyl alcohol polymer may then be isolated for further processing. For example, any remaining alkali in the composition may be neutralized, the polymer washed and dried, to recover a purified polyvinyl alcohol polymer. The manner of isolation may depend on the solubility of the resulting vinyl alcohol polymer in the process solvents used, and may include anti-solvent precipitation, drying, or a combination thereof.

Carbonyl groups may be introduced along the polymer chain during the above-described reactions, as noted above. The amount of carbonyl groups introduced may depend upon the oxidizing agent used, the amount of oxidizing agent used, as well as the reaction conditions used. In general, an increased amount of oxidizing agent results in an increased amount of resulting carbonyl groups introduced to the polymer. For example, in some embodiments, carbonyl groups may be introduced along the polymer chain in an amount ranging from about 0.01 mol % to about 3 mole %, such as from about 0.01 mol % to about 1.5 mol %, or from about 0.2 mol % to about 1 mol % in other embodiments.

The resulting vinyl alcohol polymer may then be further treated, in step (3), to introduce polyene groups into the backbone of the polymer and to result in a polyvinyl alcohol having a desired degree of hydrolysis. For example, the resulting polyvinyl alcohol dispersing agent may have a degree of hydrolysis in the range from about 60 to about 80% in some embodiments; in the range from about 65 to about 75% in other embodiments; and in the range from about 69 to about 75% in yet other embodiments, as indicated by titration analyses.

In some embodiments, reaction step (3) may be conducted via heating of the partially hydrolyzed polyvinyl alcohol, where the heating may be performed in the absence of an added salt or catalyst, such as a sodium, aluminum, zinc, magnesium, or calcium salt, like sodium acetate for example. Accordingly, the heat treatment may cleave a fatty acid, introducing double bonds to the backbone of the polymer chain. Heat treatment may be conducted at a temperature in the range from about 50° C. to about 200° C., such as from about 90° C. to about 180° C., or from about 100° C. to about 160° C.

The combined processing via reaction steps (2) and (3), as described above, may be used to introduce conjugated double bonds (polyenes) along the backbone of the polymer chain proximate a carbonyl group. In other words, processes disclosed herein result in carbonyl conjugated double bonds along the polymer chain. The polyenes may include, for example, two conjugated double bond groups (doublet) or three conjugated double bond groups (triplet), as may be illustrated by the following formulae, expanding upon "x" group in reaction step (3) above.

Double bonds along the backbone of the polymer chain may enhance the ability of the dispersing agent to interact with vinyl monomers, such as vinyl chloride, for example. With respect to the conjugated double bond segments (segment x), it is desirable to have blocks of two or more adjacent double bond segments, such as blocks having three adjacent conjugated double bond segments. The amount of doublets and triplets may be measured via an ultraviolet absorption spectrum of a 0.1 wt. % aqueous solution of the polyvinyl alcohol dispersing agent, where —CO—(CH=CH)$_2$— is assigned 280 nm, and –CO—(CH=CH)$_3$— is assigned 320 nm.

Polyvinyl alcohol dispersing agents according to embodiments herein may have an absorbance at a wavelength of 320 μm of not less than 0.3, as measured with respect to a 0.1 wt % aqueous solution of the polyvinyl alcohol. In other embodiments, polyvinyl alcohol dispersing agents may have an absorbance at a wavelength of 320 nm in the range from about 0.3 to about 0.6, or from about 0.3 to about 0.4 in other embodiments, as measured with respect to a 0.1 wt % aqueous solution of the polyvinyl alcohol.

Polyvinyl alcohol dispersing agents according to embodiments herein may have an absorbance at a wavelength of 280 nm of not less than 0.4, as measured with respect to a 0.1 wt % aqueous solution of the polyvinyl alcohol. In other embodiments, polyvinyl alcohol dispersing agents may have an absorbance at a wavelength of 320 nm in the range from about 0.4 to about 0.5, as measured with respect to a 0.1 wt % aqueous solution of the polyvinyl alcohol. In yet other embodiments, the polyvinyl alcohol dispersing agents may have an absorbance ratio at a wavelength of 320 nm relative to a wavelength of 280 nm (conjugated double bond triplet to conjugated double bond doublet) in the range of 0.3 to 1.0 with respect to a 0.1 wt % aqueous solution of the polyvinyl alcohol, such as in the range from about 0.5 to about 0.85 for some embodiments, and from about 0.65 to about 0.8 for other embodiments.

With respect to the block character to the acetyl and hydroxide containing groups (segments y and z), the block index (n) of the polyvinyl alcohol may be measured using $^{13}$C-NMR, such as described in U.S. Pat. No. 7,193,012, the portion of the description relevant to measuring and calculating η being incorporated herein by reference. In some embodiments, polyvinyl alcohol dispersing agents described herein may have a block index η in the range from about 0.4 to about 0.5, such as from about 0.4 to about 0.48.

Further with regard to the double bonds along the backbone of the polymer chain, segment x (including x1 and x2), compositions according to embodiments herein may comprise peaks in a 1H-NMR spectrum between about 5.25 ppm and about 6 ppm, as well as peaks between about 6 ppm and 8 ppm. More specifically, the 1H-NMR spectrum, recorded using a Bruker instrument, 400 MHz, with a sample prepared as a 5 wt % solution in DMSO (LB: single exponential/0.2 Hz; scan time: 1024 time with prodigy type or 10000 time with normal type probe; delay time: 1 sec; pulse interval 12 microseconds; DMSO peak top is set to 2.49 ppm), may include a specified ratio of integral values to a main peak integral value, defined as follows.

Main peak: integral (area under curve) of a CH peak, located at a position of about 3.85+/−0.02 ppm, which may have a width encompassing a high field limit to a low field limit range, for example, between about 3.65 or 3.7 ppm to about 4.0 or 4.05 ppm;

(a): integral of peak(s), located at a position of about 5.52+/−0.02 ppm, which may have a width encompassing a high field limit to a low field limit range, for example, between about 5.42, 5.43, or 5.44 ppm to about 5.59, 5.6, 5.61, or 5.62 ppm;

(b): integral of peak(s), located at a position of about 5.88+/−0.02 ppm, which may have a width encompassing a range, for example, between a high field limit of about 5.76 to about 5.8 ppm to a low field limit of about 5.96 to about 6.0 ppm;

(c) integral of peak(s), located at a position of about 6.53+/−0.02 ppm, which may have a width encompassing a range, for example, between a high field limit of about 5.95 to about 6.0 ppm to a low field limit of about 7.0 to about 7.1 ppm; and (d) integral of peak(s), located at a position of about 7.40+/−0.02 ppm, which may have a width encompassing a range, for example, between a high field limit of about 7.07 to about 7.12 ppm to a low field limit of about 7.68 to about 7.72 ppm.

In some embodiments, the integral values for compositions according to embodiments herein may be calculated, for example, based on the following criteria.

TABLE 1

| Peak | Position (ppm) | +/− | Width (ppm) | +/− | Low Field (ppm) | High Field (ppm) |
|------|----------------|------|-------------|------|------------------|-------------------|
| CH   | 3.85           | 0.02 | 0.34        | 0.01 | 4.02 +/− 0.02    | 3.68 +/− 0.02     |
| a    | 5.52           | 0.02 | 0.18        | 0.02 | 5.60 +/− 0.02    | 5.43 +/− 0.02     |
| b    | 5.88           | 0.02 | 0.19        | 0.01 | 5.98 +/− 0.02    | 5.79 +/− 0.02     |
| c    | 6.53           | 0.02 | 1.10        | 0.02 | 7.08 +/− 0.02    | 5.98 +/− 0.02     |
| d    | 7.4            | 0.02 | 0.61        | 0.02 | 7.70 +/− 0.02    | 7.09 +/− 0.02     |

The ratio is calculated based on the parts per hundred (pph) of the main peak. For example, the value (a) in pph may be calculated by multiplying by 100 the integral value for (a) divided by the integral value for the main peak. The relative values of each integral area for compositions according to embodiments herein may include one or more of the following:

Integral value (a) is in the range from about 0.05 to about 1 pph CH, such as from about 0.08 to about 0.9 pph CH or from about 0.1 to about 0.88 pph CH, in various embodiments;

Integral value (b) is in the range from about 0.1 to about 0.4 pph CH, such as from about 0.11 to about 0.19 pph CH or from about 0.13 to about 0.19 pph CH, in various embodiments;

Integral value (c) is in the range from about 0.7 to about 0.8 pph CH, such as from about 0.72 to about 0.77 pph CH, or from about 0.73 to about 0.76 pph CH, in various embodiments; and/or Integral value (d) is in the range from about 0.2 to about 0.3 pph CH, such as from about 0.21 to about 0.25 pph CH, from about 0.22 to about 0.24 pph CH, or about 0.23 pph CH, in various embodiments.

Placing the above in tabular form, the integral value for compositions according to embodiments herein may be as follows.

TABLE 2

| Peak Area | Embodiment 1: (pph CH) | Embodiment 2: (pph CH) | Embodiment 3: (pph CH) |
|---|---|---|---|
| a | 0.05-0.15 | 0.08-0.12 | 0.087-0.11 |
| b | 0.1-0.4 | 0.11-0.19 | 0.13-0.19 |
| c | 0.7-0.8 | 0.72-0.77 | 0.73-0.76 |
| d | 0.2-0.3 | 0.21-0.25 | 0.22-0.24 |

While not wishing to be bound by theory, it is theorized that the differences in NMR spectra may be attributed to the presence of interior double bond peaks adjacent to carbonyl groups and well removed from the terminal ends of the polymeric chain. The movement of the interior peaks is different than the movement of peaks proximate the end of the chain, and thus the spectra can be used to distinguish compositions according to embodiments herein over those of similar, but different, materials, such as may be formed by different chemical processing techniques than those illustrated in the reaction scheme described above.

The molecular weight and solubility of the polyvinyl alcohol dispersing agent may also affect the ability of the dispersing agent to form a stable suspension. Polyvinyl alcohol dispersing agents according to embodiments herein may have a viscosity in the range from about 4 cP to about 10 cP, as measured using a 4 wt % aqueous solution of the polyvinyl alcohol, such as a viscosity in the range from about 4.5 cP to about 6.5 cP. Viscosity may be measured, for example, using a Brookfield viscometer, type LVDV-II+Pro, using spindle #18 at 100 rpm and at a temperature of about 20° C.

In some embodiments, polyvinyl alcohol dispersing agents disclosed herein may have a cloud point in the range from 35° C. to 50° C., measured with respect to a 1 wt % aqueous solution of the polyvinyl alcohol, such as in the range from about 38° C. to about 45° C. or from about 39° C. to about 42° C. The cloud point is the temperature at which solubility of the polyvinyl alcohol dispersing agent loses at least partial solubility in the aqueous solution, the dissolved solids no longer completely soluble precipitate or form a second phase, giving the fluid a cloudy appearance. In some embodiments, polyvinyl alcohol dispersing agents herein may have a cloud point in the range from about 35° C. to about 50° C., but the resulting solution may be relatively stable, such as where no visible accumulation of precipitate is observed, even at elevated temperatures, such as up to about 70° C. or greater.

Polyvinyl alcohol dispersing agents disclosed herein may be used alone or in admixture with one or more additional dispersing agents. For example, for suspension polymerization of vinyl monomers, such as a vinyl chloride monomer, polyvinyl alcohol dispersing agents disclosed herein may be used as a primary dispersing agent in combination with one or more secondary dispersing agents. Secondary dispersing agents may include additional polyvinyl alcohol polymers or copolymers, as well as other compounds such as a cellulose or cellulose derivative, for example methyl cellulose, ethyl cellulose, hydroxymethyl cellulose, hydroxypropylmethyl cellulose, hydroxybutylmethyl cellulose, hydroxyethyl cellulose, and carboxymethyl cellulose, among others. Polyvinyl alcohol dispersing agents disclosed herein may also be used as a secondary dispersing agent in combination with one or more primary dispersing agents, such as a cellulose or cellulose derivative.

As noted above, the polyvinyl alcohol dispersing agents described herein may be used as a dispersing agent for suspension polymerization of vinyl compounds. The following discussion will touch on aspects of suspension polymerization processes that may benefit from polyvinyl alcohol dispersing agents described herein.

Various methods may be used to perform a suspension polymerization with the polyvinyl alcohol dispersing agents disclosed herein. For the suspension polymerization, the polyvinyl alcohol dispersing agent may be added to the polymerization system, typically an aqueous medium, in the form of a powder or an aqueous solution, and may be added in one or more addition steps.

Suspension polymerization of a vinyl compound, such as a vinyl chloride monomer (VCM), may proceed according to various methods known in the art. For example, water and one or more dispersing agents, including a dispersing agent according to embodiments herein, may be introduced as an initial charge into a polymerization reactor. A portion of the VCM to be polymerized may then be added, such as 20-80% by weight of the total VCM to be polymerized. Subsequently, one or more initiators and adjuvants, such as antioxidants, pH regulators, etc., may be added to the polymerization reactor. The order of addition is generally dependent upon the technical capacities of the equipment and can be chosen as desired. Polymerization initiators may include organic diacyl peroxides, peroxy esters, peroxodicarbonates or similar compounds, such as, for example, azo compounds, as well as mixtures of the aforementioned initiators. The antioxidant may be, for example, a sterically hindered phenol. To adjust the pH value of the polymerization system, one or more compounds, such as, for example, citric acid, sodium bicarbonate and/or a different buffer salt, may be used.

The composition may be intimately mixed by stirring with a stirring device or a dispersing or homogenizing device, for example a high-speed stirrer, a rotor-stator system or a homogenizing pump with a suitable aperture or suitable slot. The addition of one or more dispersing agents, including the polyvinyl alcohol dispersing agents disclosed herein, may provide for the formation of a stable suspension or dispersion. The stabilized dispersion may be formed having a median droplet size in the range from 10 microns to 200 microns, for example, where the preferred droplet size may depend on the reactor type and polymer grade, among other factors. If desired, it is also possible for one or more ionic and/or non-ionic surfactants, such as alkanesulfonates or sorbitan esters, to be used in order to facilitate the adjustment of the droplet size by lowering the interfacial tension.

The polymerization is started by the heating of the reaction mixture and by the resulting decomposition of initiator. The addition of the remaining VCM can start as early as during the heating phase. Preferably, the addition of the remaining VCM (20-80% by weight) is started once the polymerization temperature has been reached, where the polymerization temperature may be in the range from about 20° C. to about 90° C., for example. The addition of VCM may take place over a relatively long period and should preferably end when the customary pressure drop begins towards the end of the polymerization. Preferably, the addition of VCM is carried out in such a way that the rate of addition corresponds at least to the rate of conversion, i.e., of the conversion of monomer to polymer, or exceeds that rate. The addition of the remaining VCM should, however, at least compensate for the shrinkage in volume resulting from the conversion taking place. The addition of the remaining VCM may be effected continuously or intermittently in a plurality of portions.

When the suspension polymerization of a vinyl compound is carried out using the polyvinyl alcohol dispersion stabilizers disclosed herein, the amount of the dispersion stabilizer to be used is not particularly limited, and may be selected to facilitate a desired droplet size or the desired performance in a particular reaction scheme. In some embodiments, the polyvinyl alcohol dispersion stabilizers may be used in an amount ranging from about 100 ppm to about 50,000 ppm by weight with respect to a total amount of the vinyl compound. In other embodiments, the polyvinyl alcohol dispersion stabilizers may be used in an amount ranging from about 200 ppm to about 2000 ppm by weight with respect to a total amount of the vinyl compound. In yet other embodiments, the polyvinyl alcohol dispersion stabilizers may be used in an amount ranging from about 800 ppm to about 1500 ppm by weight with respect to a total amount of the vinyl compound. The resulting droplet size may depend on various factors, including amount of dispersing agent used, relative amount of the initial charge of vinyl monomer, agitation rates, and agitator types (e.g., paddle versus impeller), among other factors.

EXAMPLES

Example 1

A polyvinyl alcohol dispersing agent was prepared according to the reaction scheme above (reaction steps (1) through (3)). The reaction step (1) was performed in the absence of any added comonomer or chain transfer agents, reaction step (2) was performed using sodium hydroxide and hydrogen peroxide, and reaction step (3) was performed without any added catalysts. Reaction step (1) was performed with vinyl acetate to produce a polyvinyl acetate having a degree of polymerization in the range of 600 to 1000. In reaction step (2), saponification, the resulting polyvinyl acetate was dissolved to form a 40 wt % solution in methanol. 0.003 mol NaOH per mol polyvinyl acetate was added to the solution at a temperature ranging from about 25° C. to about 40° C., and allowed to react for a reaction time of about 10 to about 60 minutes. Toward the end of the saponification step, hydrogen peroxide, at an amount in the range from about 0.5 wt % to about 4 wt %, was added to the solution and the solution was heated to a temperature in the range from about 100° C. to about 150° C.

Properties of the resulting polyvinyl alcohol dispersing agent were then measured, including cloud point, degree of hydrolysis, solution viscosity, block index, UV absorbance, and VCM dispersibility performance. The analyses results are presented in Table 3 below, and are compared to results for various commercially available polyvinyl alcohol dispersing agents.

Cloud point was measured via visual determination of a 1 wt % solution of the dispersing agent in water while heating.

Viscosity was measured with respect to a 4 wt % aqueous solution using a Brookfield viscometer, type LVDV-II+Pro, using spindle #18 at 100 rpm and at a temperature of 20° C.

Degree of hydrolysis was measured using titration.

UV Absorbance was measured with respect to a 0.1 wt % aqueous solution of the dispersing agent using an Evolution 600 UV-Vis Spectrophotometer, available from Thermo Fisher, Pittsburgh, Pa., USA.

Block index was measured using $^{13}$C-NMR, using a procedure similar to that as described in U.S. Pat. No. 7,193,012, as noted above.

The properties of polyvinyl alcohol dispersing agents S1 and S2 according to embodiments herein are compared to commercially available dispersing agents (C1-C4). The structure of the dispersing agents is summarized in Table 3.

TABLE 3

| Samples | S1 | S2 | C1 | C2 | C3 | C4 |
|---|---|---|---|---|---|---|
| Degree of hydrolysis, mol % | 70.9 | 72.4 | 71.5 | 71.4 | 72.5 | 72.0 |
| 4% viscosity, cP | 5.6 | 5.9 | 5.8 | 5.2 | 10.4 | 6.7 |
| Block index | 0.48 | 0.47 | 0.42 | 0.52 | 0.44 | 0.44 |
| UV abs. at 320 nm | 0.35 | 0.33 | 0.34 | 0.28 | 0.06 | 0.05 |
| Cloud Point, ° C. | 40 | 35 | 30 | 32 | 65 | No |
| 1H-NMR Spectra | | | | | | |
| (a), pph CH | 0.1 | 0.088 | 0 | 0 | 0.03 | 0 |
| (b), pph CH | 0.17 | 0.13 | 0.04 | 0.022 | 0.07 | 0.006 |
| (c), pph CH | 0.73 | 0.78 | 0.82 | 0.82 | 1.41 | 0.70 |
| (d), pph CH | 0.23 | 0.23 | 0.18 | 0.22 | 0.29 | 0.05 |

Figure 1:
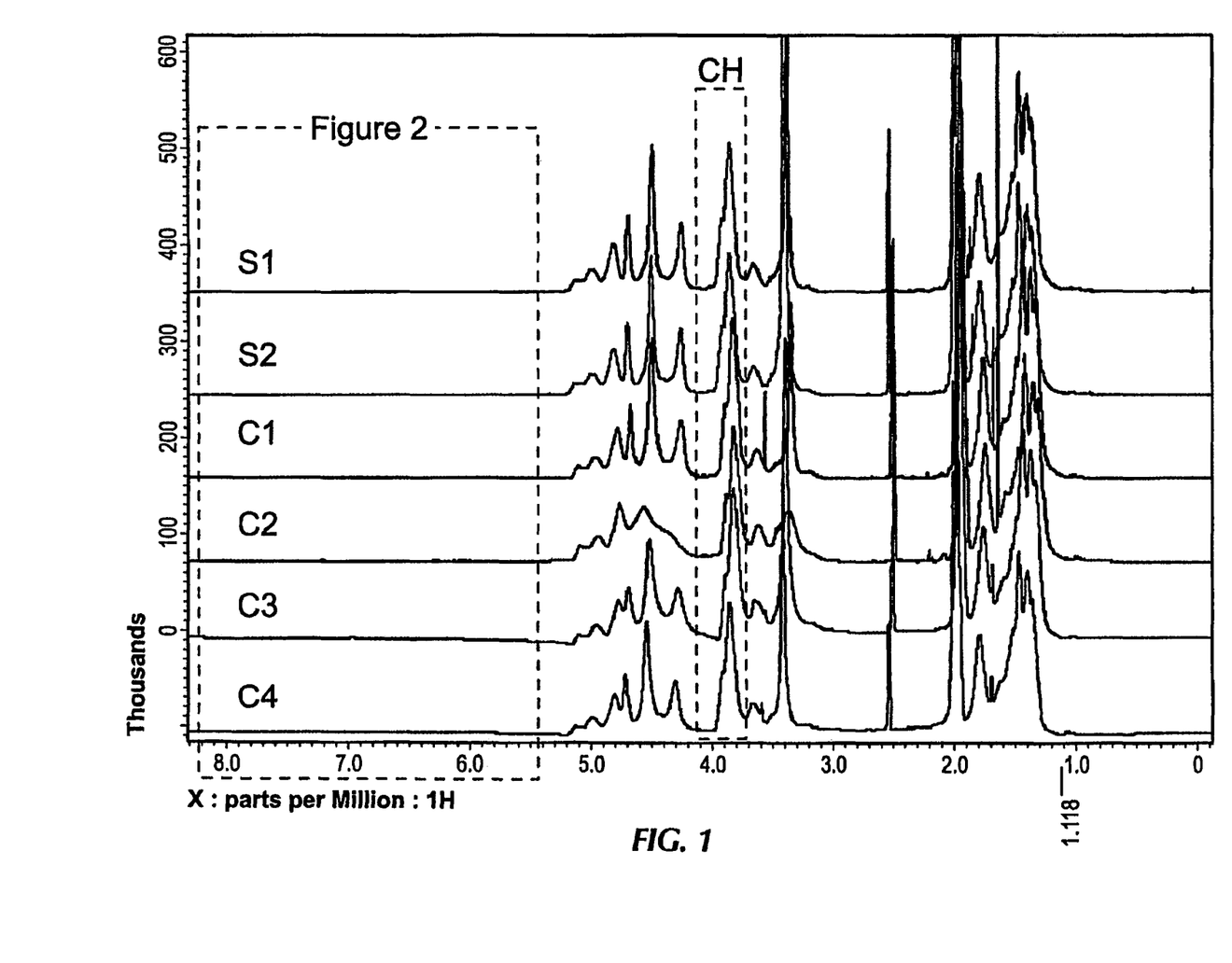
FIGS. 1 and 2 compare 1H-NMR spectra of compositions according to embodiments herein to commercially available dispersing agents, where FIG. 1 provides the spectra from 0 to 9 ppm, and FIG. 2 provides expanded data relative to the spectra range from 5 to 9 ppm.
Figure 2:
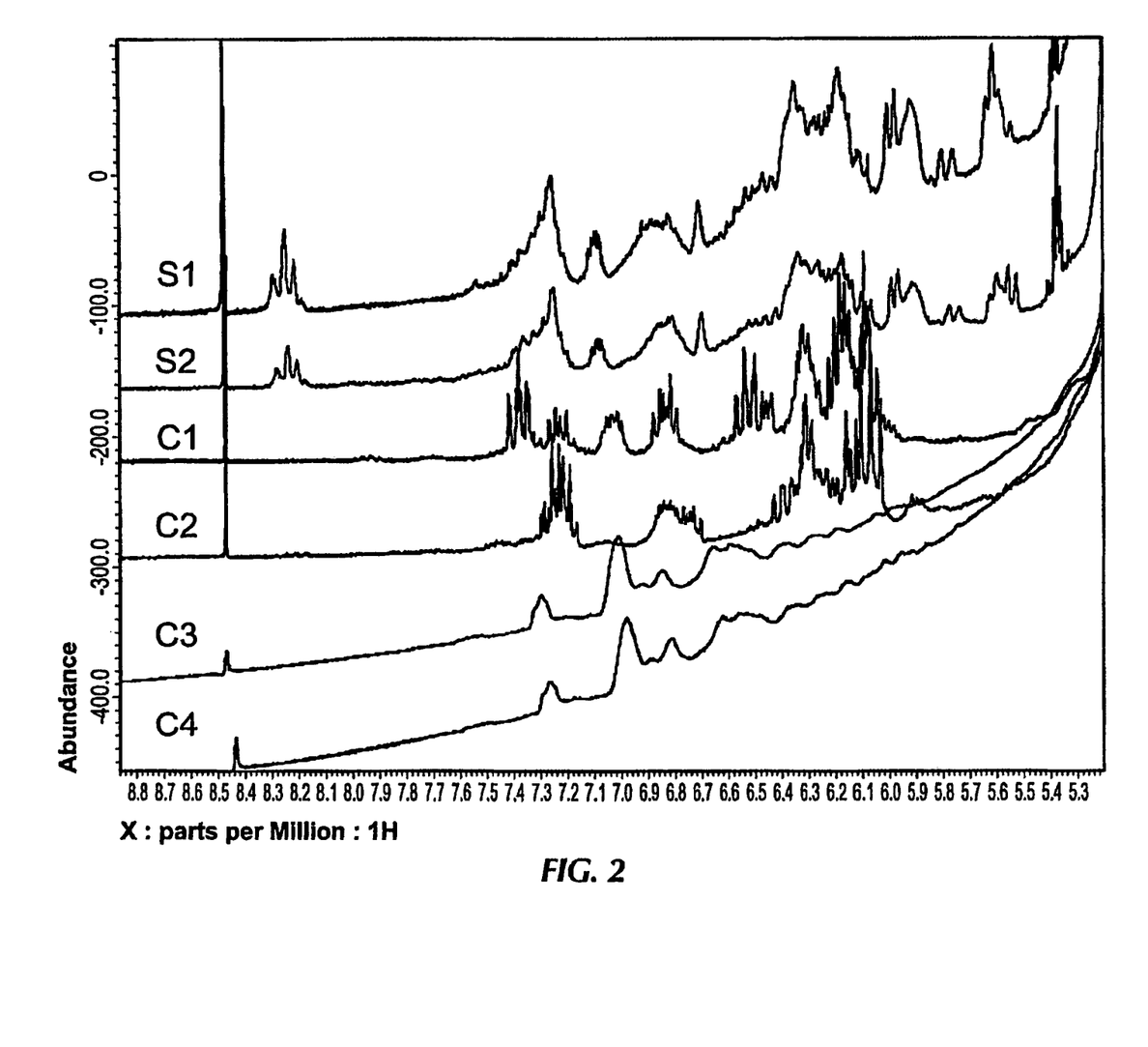
Figure 3:
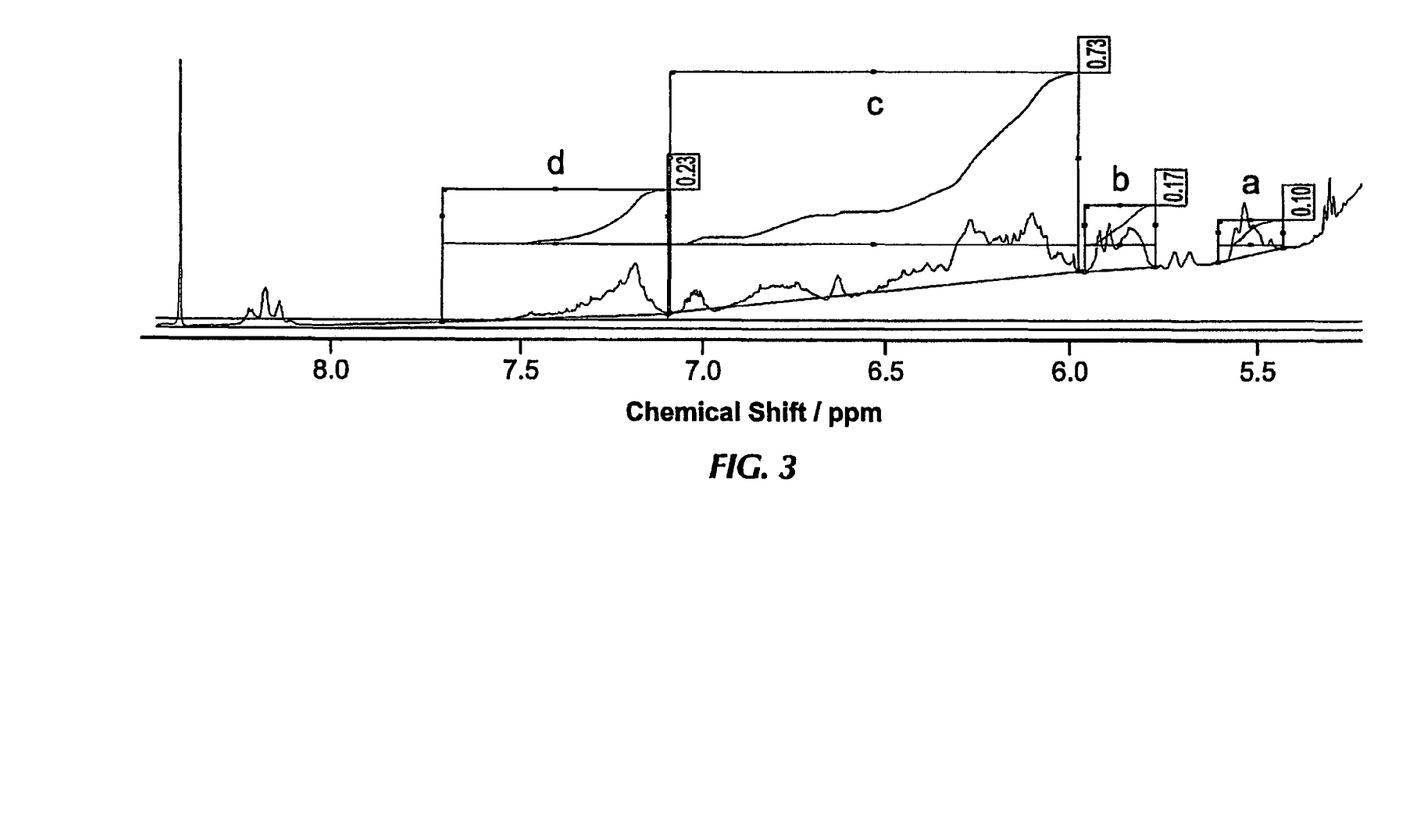
FIG. 3 provides an example 1H-NMR integration for a composition according to embodiments herein.

The 1H-NMR spectra for the above samples is compared in FIGS. 1 and 2, with FIG. 3 illustrating an integration to arrive at the values a, b, c, and d. The ranges for each or a, b, c, and d are as defined above. The 1H-NMR spectra illustrating the differences in position and relative amounts of the double bonds for the samples as indicated in Table 3 may be based on method of preparation and confirmed by analyses. For C1 and C2, the use of a chain transfer agent, such as an aldehyde, limits the position of the double bonds adjacent to a carbonyl group to the terminal portion of the polymer chain. For C3 and C4, the use of a comonomer introduces double bonds along the polymer chain, but due to the comonomer, there is a lack of carbonyl conjugated double bonds, as indicated by the extremely low UV absorbance at 320 nm. The structure of polymer compositions according to embodiments herein may thus be distinguished based on one or more of the 1H-NMR, UV absorbance, and cloud point properties, among other distinguishing factors.

The dispersing agents in Table 3 were evaluated for the production of polyvinyl chloride. The reaction was performed in a 216 liter reactor having a Dual Pfaudler type impeller. The reaction recipe include 94.8 kg water, 73 kg vinyl chloride, t-butyl peroxydeodecanoate (385 ppm/vinyl chloride monomer), cumyl peroxydeodecanoate (150 ppm/vinyl chloride monomer), and dispersing agent at a loading as indicated in Table 4 below (ppm/vinyl chloride monomer).

TABLE 4

| Sample | | PVOH Dosage, ppm | PVOH tank temp. |
|---|---|---|---|
| Inventive 1 | S1 | 1100 | 25 |
| Inventive 2 | S1 | 850 | 25 |
| Inventive 3 | S1 | 1100 | 32 |
| Inventive 4 | S2 | 1100 | 25 |
| Comparison1 | C1 | 1100 | 25 |
| Comparison2 | C1 | 850 | 25 |
| Comparison3 | C1 | 1100 | 32 |
| Comparison4 | C2 | 1100 | 25 |
| Comparison5 | C3 | 1100 | 25 |
| Comparison6 | C4 | 1100 | 25 |

The reaction was conducted at 57.5° C., a finished pressure of 0.706 MPa, a six hour reaction time, and agitation at 398 rpm. The resulting PVC was analyzed and a comparison of the results is provided in Table 5.

TABLE 5

| | PVC evaluation | | | |
|---|---|---|---|---|
| | Mean particle size, μm | Bulk Density, g/cm3 | Porosity, % | Polymerization degree |
| Inventive 1 | 105 | 0.450 | 24.4 | 1035 |
| Inventive 2 | 135 | 0.441 | 24.2 | 1055 |
| Inventive 3 | 104 | 0.455 | 24.4 | 1050 |
| Inventive 4 | 101 | 0.463 | 25.1 | 1033 |
| Comparison1 | 141 | 0.452 | 26.0 | 1062 |
| Comparison2 | 172 | 0.452 | 25.8 | 1023 |
| Comparison3 | 172 | 0.448 | 26.1 | 1050 |
| Comparison4 | 152 | 0.452 | 24.4 | 1045 |
| Comparison5 | 130 | 0.501 | 22.3 | 1036 |
| Comparison6 | 138 | 0.475 | 23.0 | 1028 |

Polyvinyl alcohol dispersing agents described herein may provide for a unique combination of properties that may be advantageous, such as for use in suspension polymerization processes for producing polyvinyl chloride polymers, among others. The unique combination of cloud point, block index, and absorbance may result in the dispersing agents disclosed herein providing for a stable suspension, even at elevated temperatures. The stability of the suspension may allow for batches of the dispersing agent and water to provide consistent performance, even with swings in ambient or storage temperature. Dispersing agents according to embodiments herein may also provide excellent dispersion formation characteristics, providing for similar droplet size at lower dosage levels or a smaller droplet size at equivalent dosage levels, as well as stability of the suspension over a wide temperature range. Further, polyvinyl alcohol dispersing agents described herein may provide for additional benefits, albeit not yet measured, with respect to foaming, scaling, and other aspects of solution polymerization.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A dispersing agent useful in a suspension polymerization process, the dispersing agent comprising:
   a polyvinyl alcohol formed by a process comprising:
   polymerizing a vinyl ester monomer to form a polyvinyl ester;
   partially hydrolyzing the polyvinyl ester to produce a partially hydrolyzed polyvinyl ester;
   heat treating the partially hydrolyzed polyvinyl ester to form the polyvinyl alcohol;
   wherein the partially hydrolyzing step comprises contacting the polyvinyl ester with an alkali hydroxide and with hydrogen peroxide;
   the polyvinyl alcohol having:
   a degree of hydrolysis in the range from 60 to 80 mol %;
   an absorbance of not less than 0.3 measured at a wavelength of 320 nm with respect to a 0.1 wt % aqueous solution of the polyvinyl alcohol;
   a block character of remaining ester groups in the range from 0.4 to 0.5;
   a cloud point in the range from 35° C. to 50° C. measured with respect to a 1 wt % aqueous solution of the polyvinyl alcohol; and
   carbonyl groups distributed along the length of the polymer chain;
   wherein the polymerizing step is preformed in the absence of both an added chain transfer agent and an added comonomer.

2. The dispersing agent of claim 1, wherein the polyvinyl alcohol comprises a partially hydrolyzed polyvinyl acetate having a general formula represented by:

where
   Ac represents an acetyl group; and
   x, y, and z represent a relative mole fraction of the respective groups and are each between 0 and 1.

3. The dispersing agent of claim 1, the polyvinyl alcohol having a degree of hydrolysis in the range from 69 to 75 mol %.

4. The dispersing agent of claim 1, the polyvinyl alcohol having a viscosity in the range from about 4 cP to about 10 cP, as measured using a 4 wt % aqueous solution of the polyvinyl alcohol.

5. The dispersing agent of claim 1, the polyvinyl alcohol having a viscosity in the range from about 4.5 cP to about 6.5 cP, as measured using a 4 wt % aqueous solution of the polyvinyl alcohol.

6. The dispersing agent of claim 1, wherein the vinyl ester monomer comprises vinyl acetate monomer.

7. The dispersing agent of claim 1, wherein the heat treating step is performed in the absence of an added salt or catalyst.

8. The dispersing agent of claim 1, wherein the polyvinyl alcohol has a 1H-NMR spectra comprising:
   an integral value (a), defined as the area of a peak proximate 5.52+/−0.02 ppm, in the range from about 0.05 to about 0.15 pph CH, CH being defined as the area of a peak proximate 3.85+/−0.02 ppm; and
   an integral value (b), defined as the area of a peak proximate 5.88+/−0.02 ppm, in the range from about 0.1 to about 0.4 pph CH.

9. The dispersing agent of claim 8, wherein the polyvinyl alcohol has a 1H-NMR spectra comprising:

an integral value (c), defined as the area of a peak proximate 6.53+/−0.02 ppm, in the range from about 0.7 to about 0.8 pph CH; and an integral value (d), defined as the area of a peak proximate 7.40+/−0.01 ppm, in the range from about 0.2 to about 0.3 pph CH.

10. A dispersion comprising the dispersing agent of claim 1 and water.

11. The dispersion of claim 10, further comprising at least one of a vinyl monomer and an initiator.

12. The dispersion of claim 10, wherein the vinyl monomer comprises vinyl chloride monomer.

13. A process for producing a polyvinyl chloride, the process comprising:

admixing the dispersing agent of claim 1 with a vinyl chloride monomer and water to form a suspension; and polymerizing the vinyl chloride monomer to form a polyvinyl chloride.

14. The process of claim 13, wherein the suspension further comprises a secondary dispersant.

\* \* \* \* \*